United States Patent [19]

Kershaw et al.

[11] 3,933,579

[45] Jan. 20, 1976

[54] VESICULATED POLYMER GRANULES

[75] Inventors: Robert William Kershaw; Frederick John Lubbock; Livia Polgar, all of Victoria, Australia

[73] Assignee: Dulux Australia Limited, Melbourne, Australia

[22] Filed: Aug. 4, 1971

[21] Appl. No.: 169,116

Related U.S. Application Data

[63] Continuation-in-part of Ser. No. 877,498, Nov. 17, 1969, abandoned.

[30] Foreign Application Priority Data

June 28, 1971 Australia.............................. 5329/71

[52] U.S. Cl................... 162/164; 162/168; 162/169; 260/2.5 B; 260/2.5 AK; 260/2.5 R; 260/2.5 H; 260/2.5 HB; 260/2.5 F; 260/2.5 HA; 260/2.5 N; 260/2.5 EP; 260/22 T; 260/29.3; 260/29.4 R; 260/29.6 WQ; 260/29.6 RB; 260/29.7 H; 260/42.29; 260/42.54; 260/42.55; 260/230; 260/836; 260/837 R; 260/862; 260/885; 427/385; 427/387

[51] Int. Cl.$^2$..... D21D 3/00; D21H 3/30; C08J 9/00

[58] Field of Search.................... 260/2.5 B, 2.5 AK

[56] References Cited

UNITED STATES PATENTS

| | | | |
|---|---|---|---|
| 3,255,127 | 6/1966 | Von Bowin et al. | 260/2.5 B |
| 3,371,053 | 2/1968 | Raskin | 260/2.5 B |
| 3,472,801 | 10/1969 | Lerman et al. | 260/2.5 B |

*Primary Examiner*—Richard B. Turer
*Attorney, Agent, or Firm*—Cushman, Darby & Cushman

[57] ABSTRACT

The invention relates to vesiculated polymer granules having a plurality of discrete internal vesicles whose walls are provided by said polymer, said granules having a mean diameter of 1–500 micron, the vesules having a maximum diameter of 20 micron and containing particulate solids at a concentration not exceeding 60% of the vesicle volume.

28 Claims, No Drawings

VESICULATED POLYMER GRANULES

The present application is a continuation-in-part of our co-pending application Ser. No. 877,498 filed on the 17th Nov., 1969, and now abandoned.

The invention relates to vesiculated polymer granules and to coating compositions comprising such granules. It has been proposed to use particles of certain polymers, for example poly(ethylene) and poly(propylene) as insoluble components of paints and polymeric films. The particles, being of similar refractive index to the medium in which they are incorporated, have little if any effect on the opacity of films thereof, but when of suitable size they can disrupt the exposed film surfaces to produce a matting or texturing effect.

We have now found that polymer granules prepared in a manner which imparts to them a vesiculated structure can be utilised in paints and polymers to impart to them an opacity which is surprisingly and usefully greater than that given by non-vesiculated granules of the same composition. We have also found that the opacifying effect of the granules can be further increased by including particulate solids within the individual vesicles. Approximately dimensioned granules of this type produce a matting or texturing effect on the surface of a film in which they are incorporated, when they are of a suitable size.

By vesicualted polymer granules we mean granules of polymer which are preferably spheroidal and which have a cell-like internal structure, the walls of which are provided by the polymer. The granules comprise a plurality of discrete cells or vesicles, that is they are not monocellular or balloon-like, nor do they have the open-pored cellular structure of a sponge.

In the type of granules with which this invention is concerned, each vesicle should ideally be enclosed in a continuous shell of polymer, but it is not always easy nor is it essential to achieve this. For example, if the granules are prepared by the mechanical degradation of bulk vesiculated polymer, substantially all of the vesicles adjacent to the outer surface of the granules will be imperfect; that is, part of the shell of polymer which preferably encloses them will be broken away. Alternatively, if the granules are produced directly in their required size and shape, e.g. by a suspension polymerization process, there will be a random distribution of imperfect vesicles formed therein.

The particular granules to which this invention relates contain from 5 to 95% by volume of vesicles and their mean diameter, as measured optically, which may be from 1 to 500 micron or more, is related to their end use. Low vesicle volumes are usually associated with granules of high mechanical strength, which are particularly useful for some purposes, but when maximum opacifying effects are required we prefer that the vesicles occupy at least 20% and more preferably 20–75% of the total granule volume. Granules having a mean diameter of 50 to 500 micron or more can be used to obtain texturing effects in paint and polymer films. In general we find that granules having a mean diameter of 1 to 100 micron are of the most value as, for example, opacifying and opaque matting agents.

Preferably, when used as opaque matting agents and especially in paints, the granules should have a mean diameter of 1 to 50 micron.

Bearing in mind the economic and practical limitations on the preparation and measurement of particulate solids, it is to be understood that the above limits comprehend the presence of a minor proportion, but not more than 10% by weight, of granules which lie outside the stipulated dimensions. Preferably, when used as opacifying or matting agents, essentially no granule should exceed the upper dimension limits by more than 20 micron.

Although the shape of the granules is not critical in achieving some increase in opacity in a film, we have found that chunky or spheroidal structures give the best results. When the granules are produced by, for example, the degradation of bulk polymer, many of the vesicles adjacent to the surface of the granules are imperfect. The presence of these surface imperfections in the granule tends to reduce its effectiveness as an opacifying agent; there are then less fully defined vesicles present in a granule of a given diameter and the imperfect vesicles provide a porous surface which may imbibe medium in which the granule is embedded, thus reducing the effective vesicle volume of the final composition. In a preferred embodiment, therefore, the granules are spheroidal and have an essentially non-porous surface.

The vesicles are not necessarily of uniform size, although it is undesirable to have present a significant proportion of vesicles which are grossly larger in diameter than the mean vesicle diameter. A factor of considerable importance is, however, the ratio of the diameter of the granule to the mean diameter of vesicles contained therein. In order to achieve the desired opacifying effect we have found that the diameter of the granules relative to that of the mean diameter of the vesicles should be at least 5 to 1. Furthermore, the vesicles, which are roughly spherical in shape, should have a diameter of less than 20 micron and preferably less than 5 micron. The maximum acceptable diameter will, of course, depend to a degree on the average diameter of the granule, but we have found that the opacifying effect usually increases as the diameter of the individual vesicles decreases, the theoretical optimum light-scattering effect of vesicles containing air being achieved in the range of 0.2 – 1.5 micron diameter.

Our usual method of determining vesicle dimensions is to prepare sections of granules embedded in a hard resinous matrix and to measure the dimensions by examination with an electron microscope. The best results, especially when the granule surfaces are also being checked for porosity, are given using a scanning electron mecroscope. In calculating mean vesicle diameters, the presence of occasional vesicles of gross proportions or the appearance of a cenosphere are ignored, when they are obviously atypical of the granules as a whole.

The vesicles may be essentially gaseous; that is they may be bubbles of air of other gas. In liquid coating compositions e.g. paints, they may be saturated with vapour, for example with vapour diffusing into the vesicles through their polymeric walls from a liquid medium in which the granules are suspended, or they may be at least partially filled with liquid, for example water or an organic liquid imbibed from the liquid medium in which the granules are suspended. When the granules are to be used in paints we prefer that any liquid in the vesicles be sufficiently volatile to diffuse out of the granules in contact with air. That is, when a paint film is formed on a substrate from the composition and dried in air, optionally at an elevated baking temperature, the granules provide essentially gaseous vesicles and in this physical form exert a preferred opacifying effect on the film.

In a further embodiment of the invention, the vesicles contain particulate solids. The particulate solids may be dispersed therein in a liquid in which the polymer is insoluble or may be associated in the vesicle with essentially gaseous components alone. For example, the vesicles may initially consist of particulate solids, e.g. particles of pigment, fungicide, insecticide or other toxic materials or blowing agents dispersed in a suitably volatile liquid which subsequently diffuses out of the granules to leave essentially dry particulate solids. The upper limit of concentration of particulate solids which can be incorporated is about 60% of the vesicle volume, so that there will always be a significant amount of liquid and/or vapour within the vesicle in addition to the particulate solids. In practice, we have observed that although the solids distribute themselves in a random fashion within the vesicles they usually tend to concentrate adjacent to the vesicle wall and it is usually difficult (and economically undesirable) in a commercially viable product to exceed our preferred concentration of 45% by volume of particulate solids in the vesicles.

Optionally, the polymer of the granule may itself be pigmented, but in order to achieve a useful mechanical strength the degree of pigmentation must not exceed the critical pigment volume concentration. This parameter is a known physical transition point in pigment-binder systems and is defined, for example, in "Industrial and Engineering Chemistry," 41, 17, 1470 (1949). At higher pigment volume concentrations the granules have been found to be too mechanically weak for most uses, even at relatively low vesicle volumes.

Broadly speaking, the nature of the polymer is not critical provided it is insoluble in the coating composition in which the granules are to be used. Due regard must be paid in selecting the polymer, to the conditions of temperature and mechanical stress to which it will be subjected in use. For example, a granule comprising polymer which has a glass transition temperature substantially lower than that at which it is intended to be used may be irreversibly distorted and lose its characteristic vesiculated structure when so-used; which would be an unsatisfactory choice of polymer. To achieve adequate mechanical stability, especially when used in paints where, for example, distortion of a paint film, e.g. by abrasion, may disfigure or rupture the film we prefer that the polymer, optionally pigmented, should be relatively rigid; that is, with an elongation at break of the order of 40% or less.

Suitable polymers are, for example, the condensation products of polycarboxylic acids with polyols; polycarboxylic acids with polyamines; caprolactam condensation products of the nylon 6 type; polyester amides; polyurethanes comprising the reaction products of polyisocyanates with polyols; polyethers; polyesters; epoxide and epoxy-amine resins; polyamides and ionic polymers such as nylon 66 salt.

Also suitable are condensates of formaldehyde with urea, melamine and phenols; esters of cellulose such as cellulose nitrate and cellulose acetate butyrate; chlorinated rubbers.

Our preferred polymers, however, are polymers and copolymers of $\alpha,\beta$-ethylenically unsaturated monomers and suitable monomers are, for example, aromatic substituted ethylenes, e.g. styrene, $\alpha$-methyl styrene and 'vinyl toluene'; optionally these may be copolymerized with a comonomer such as maleic anhydride or an unsaturated polyester;

vinyl acetate;

saturated alcohol esters of acrylic and methacrylic acids, e.g. their methyl, ethyl an n-butyl esters; optionally these may be copolymerized with a comonomer such as acrylic or methacrylic acid;

esters and acid esters of unsaturated polybasic acids, e.g. the ethyl, n-butyl and 2-ethyl hexyl esters and acid esters of maleic and fumaric acids.

Preferably the toughness and hardness of the polymer is increased by the introduction of a controlled degree of cross-linking. In the case of polymers derived from $\alpha,\beta$-ethylenically unsaturated monomers, crosslinking can be introduced by use of a di-functional comonomer. For example, a cross-linked copolymer can be formed by the addition polymerization of methyl methacrylate monomer containing a minor proportion, e.g. 1 to 5% by weight of divinyl benzene or ethylene glycol dimethacrylate.

When the granules are required to release volatile liquid from the vesicles in contact with air, due regard must be paid in the selection of the polymer to its effect on the diffusion rate of the liquid. For example, while the polymer walls enclosing the vesicles are usually sufficiently thin to permit considerable latitude in selection of the polymer without markedly affecting the diffusion rate, a homopolymer of vinylidene chloride is relatively vapour impermeable. Some degree of control of diffusion of liquid can, therefore, be exercised by using vinylidene chloride as a comonomer in preparing the polymer. Methods of selecting polymer of particular diffusion characteristics are known in the art.

The particulate solids used in the granules may be pigment. The pigment is chosen from those commonly used in the art and suitable pigments are, for example:

primary white pigments, that is opaque pigments with a refractive index of greater than 1.9 e.g. titanium dioxide, zinc oxide and antimony oxide;

extender pigments, e.g. calcium carbonate, silica, barium sulphate, alumina and naturally occurring aluminum silicates, e.g. kaolinite, dickite and montmorillonite;

either singly or in combination.

The invention is not limited, however, to the use of the above types of pigment and unusual decorative effects may be produced in films by the use of granules in which the pigment is at least in part coloured. For example, the pigment may comprise iron oxide, phthalocyanine or lead chrome pigments.

The particulate solids need not, however, be pigment in the generally understood meaning of the term. For example, the particulate solids may be anti-fouling or fungicidal materials, e.g. tri-n-butyl tin fluoride, sodium pentachlor phenate and barium metaborate, insecticides, e.g. D.D.T. and hexachlorbenzene, blowing agents or odorants. Alternatively the vesicles may contain liquids having similar properties. Such materials when introduced directly into a film-forming polymer may have little opacifying effect on the film and the choice of polymer is usually restricted by the requirement that the rate of leaching or diffusion of the material from the film must be limited. It is a particular feature of our invention that when these materials are incorporated into the vesicles of the granules, especially as essentially dry particulate solids, they can contribute to the opacity of films in which the granules are incorporated and also, by suitably selecting the polymer comprising the granules, a degree of control can be exercised over the leaching or diffusion rate of the particulate solids independent of the characteristics of the film-forming polymer.

As stated above, the amount of particulate solids incorporated in the vesicles must not exceed 60% of the volume of the vesicles and while the size of the chosen particles depends on the actual vesicle diameter, we prefer that the maximum particle diameter should be 1 micron. Particles much larger than this impose considerable limitations on the amount of particulate matter which can be incorporated in the vesicles.

The granules may be prepared by the mechanical degradation of suitable polymer in which vesicles have been implanted, for example by the controlled aeration of bulk polymer. However, vesicles of the size we specify are not readily formed in a bulk polymer by, for example, direct aeration or foaming and a preferred method of preparing vesiculated polymer granules is as follows. An incompatible liquid is dispersed throughout a polymerizable monomer, the diameter of the disperse particles being related to the size of the vesicles which are to be formed, and the monomer polymerized. The incompatible liquid is trapped in the polymer so-formed, in which it forms liquid vesicles. The polymer is mechanically ground to the required granule size and shape and when it is suitably volatile, the incompatible liquid may be removed, e.g. by vacuum extraction, to provide essentially gaseous vesicles. Similarly, when the incompatible liquid comprises particulate solids, vesicles which are essentially of particulate solids/liquid or particulate solids/gas may be formed.

Alternatively, a dispersion of an incompatible liquid in a polymerizable monomer may itself be dispersed in a liquid continuous phase in which the monomer is insoluble to form droplets of the required granule size and the monomer than polymerized to form vesiculated granules of the required dimensions. Optionally the granules can be separated from the liquid of the continuous phase and liquid removed from the vesicles as described above.

As a further alternative, instead of dispersing an incompatible liquid in the monomer, there may be dissolved in the monomer a liquid which is compatible with the monomer but incompatible with the polymer. When the dispersed droplets of monomer are polymerized the then incompatible liquid forms vesicles in the polymer particles.

As an alternative in both the above processes, a solution of polymer may be used in place of the monomer, the polymer granule then being formed not by polymerization but by extraction of the solvent from the dispersed droplets of polymer solution.

As mentioned above, the granules of the invention are particularly useful as components of paints, in which they may be used, for example, to increase the polymer solids of the coating concurrent with an increase in opacity of films formed therefrom and as opaque matting and texturing agents.

Hence we provide a paint comprising (a) film-forming vehicle (b) pigment dispersed therein to a pigment volume of 0 to 85% of the solids volume of (a) plus (b) and (c) insoluble vesiculated granules as hereinabove described dispersed in the vehicle at a volume concentration of 5 to 95% of the total solids (i.e. non-volatile volume of the paint. For the best results we prefer to work at volume concentrations of granules of from 25 to 60% of the total volume. In the case of titanium dioxide the pigment volume is preferably 10 to 35% by volume of (a) plus (b).

By film-forming vehicle we mean film-forming polymer or precursor elements which on further chemical reaction produce a film-forming polymer, optionally dissolved or dispersed in a suitable liquid and including other ancillary materials, e.g. catalyst, anti-skinning agents and dispersion stabilisers, commonly used in coating formulations. In the dry paint film, the film-forming polymer, which optionally may be pigmented, provides a polymeric matrix in which the vesiculated granules are embedded. For example, the vehicle may be a solution of dispersion of film-forming polymer in an aqueous or organic liquid. Alternatively, the film-forming polymer itself may be present in the vehicle as precursor elements, usually at least in part polymeric, which when suitably catalysed or co-reacted form the film-forming polymer.

The choice of film-forming vehicle is not limited other than by the requirement that the vesiculated granules must be insoluble in it. For example, the vehicle may be an aqueous latex, for example a dispersion of poly(methyl methacrylate/ethyl acrylate) in an aqueous liquid in which is to be dispersed vesiculated granules of poly(styrene). A suitable vehicle for vesiculated poly (methyl methacrylate/ethylene glycol dimethacrylate) granules is, for example, a solution of a drying oil modified alkyd resin in an aliphatic hydrocarbon liquid.

As a further alternative, the granules may comprise vesiculated unsaturated polyester resin which has been cross-linked by reaction with e.g. styrene monomer, dispersed in a film-forming vehicle which consists of a solution of a polyepoxide compound to which is added a polyamide capable of reacting with the epoxide compound to form a cross-linked polymeric film. The polyepoxide compound and polyamide provide in the film-forming vehicle the precursor elements which on chemical reaction produce a film-forming polymer.

In general, the selection of a suitable film-forming vehicle lies within the normal knowledge and practices of the art.

Preferably, when the vehicle is a solution or dispersion of film-forming polymer in an aqueous liquid the vesicles are at least partially filled with an aqueous, optionally pigmented liquid. This is a matter of some practical importance in the application of our invention. For example, if the vesiculated granules are prepared by a suspension polymerization in an aqueous liquid the vesicles so-formed are usually at least partially filled with aqueous liquid and optionally pigment particles. We have observed that these granules can then be incorporated directly into an aqueous paint in the form of a slurry in the aqueous liquid without subjecting the granules to an intermediate drying step and this results in no observable loss of opacifying effect in a dry paint film; provided of course that the liquid is sufficiently volatile to diffuse out of the paint film as it dries.

Certain features of the granules we have described are particularly important in relation to their use in paint films. Because of the inherent opacifying effect of the granules, paints of reduced prime pigment content (e.g. titanium dioxide) can be prepared without loss of opacity and with a substantial saving in cost. The ability of the granules to function as both opacifying and matting agents is of particular value in matt and semi-gloss paints. Conventional paints of this type commonly contain a high volume concentration of pigment, a substantial proportion of which is low refractive index 'extender' pigment. The extender pigment, e.g. silica or clay, is primarily responsible for the low gloss of the films but because of its low refractive index it can have a "window" effect instead of an opacifying effect on the paint film. Furthermore, the extender particles, which must be used in relatively high volume concentrations to impart low gloss to the film, appear to abraid easily on contact, so that the paint film is easily marred. It is a particular attribute of our vesiculated granules with their relatively high particle/vesicle diameter ratio and tough, polymeric nature that they can be used to formulate matt and semi-gloss paints of both high opacity and good mar resistance.

A particularly useful application of these granules is in the preparation of matte paints, especially matte aqueous latex paints of very low gloss. In this embodiment we prefer that the granules be spheroidal, with a diameter essentially of from 1 to 50 micron and a volume average diameter of from 5 to 35 micron. The volume average diameter is defined by the expression $\sigma V' D'$ where $V'$ is the volume fraction of all particles of diameter $D'$ By essentially of from 1 to 50 micron we mean that there may be present a minor proportion, not more than 10% by weight of granules outside of these limits although preferably no particles (other than trace impurities) shall have a diameter of greater than 70 micron. For the purpose of calculating the above composition limits, any granules having a diameter of less than 1 micron are considered to be pigment particles. To achieve maximum utilisation of granules we prefer that they shall be essentially non-porous with respect to the film-forming polymer in which they are to be incorporated.

Bearing in mind that the above described vesiculated granules are somewhat similar in size and function to the extender pigments hitherto used as matting agents in flat paints, it has been proposed that they should be considered, in deriving satisfactory paint formulations as "extender pigment" and that the existing criteria which limit paint formulations would still hold if this assumption was made. Surprisingly we have now discovered that this is not so and we now disclose preferred highly opaque matte paints comprising vesiculated granules in which the proportions of ingredients are defined by new criteria which admit of compositions of satisfactory opacity containing much higher granule concentrations than would have been predicted by analogy with known paint compositions utilising conventional flatting agents.

In order to more clearly distinguish our preferred matte paint compositions we have found it desirable to consider the granules and the balance of the composition separately and to define the paint in terms of the composition of a dried film formed therefrom. The concept of relating paint composition to the dry film is in itself not novel, since it is implicit in, for example, applying the parameter of critical pigment volume concentration to paint formulations. An experienced formulator can, of course, relate the composition of the dry film to that of the parent liquid paint, using his knowledge of the art. The critical pigment volume concentration is a well-known parameter at which there is a marked transition in the mechanical properties of paint films and is defined, for example, in "Industrial and Engineering Chemistry" 41, 17, 1470 (1949), and is related to the relative volume concentration of pigment and film-forming medium often referred to as the binder, in the dry film.

A dried paint film of the type to which this invention relates consists of a polymeric film-forming binder, which typically includes pigment, in which is embedded the vesiculated polymer granules. We find it convenient to refer to all of the components other than the vesiculated granules as the 'matrix' in which the granules are embedded.

Two parameters can then be applied to the composition of the paint film, the pigment volume concentration in the matrix (M.P.V.C.) and the granule volume concentration (G.V.C.) in the dry film. These parameters are defined as follows:

$$\text{M.P.V.C.} = \frac{\text{total volume of pigment in the matrix}}{\text{total volume of matrix}} \times 100\%$$

$$\text{G.V.C.} = \frac{\text{total volume of granules in the dry film}}{\text{total volume of the dry film}} \times 100\%$$

We have now discovered that in order to achieve the best results in formulating matte paints of good opacity, the G.V.C. should lie within the range of 25 to 60 and preferably 35 to 50. At lower granule concentrations sheeriness and non-uniformity of appearance of the paint becomes increasingly evident, while at higher granule concentrations there is no useful increase in flatting but the film becomes progressively mechanically weaker. This effect appears to be largely independent of the pigment content of the matrix.

Within the above G.V.C. limits, a second controlling factor is the pigment volume concentration in the matrix. We have found that the best matte paint films of high opacity and film integrity lie within the limits of 5-35% M.P.V.C. Such films have a low porosity and good re-coating properties.

For some purposes, for example in ceiling paints, some scrub-resistance can be sacrified to achieve very low gloss. We have now found that paints of this type with gloss levels lower than 10 units (85° gloss head) can be prepared by working at M.P.V.C. values of up to about 75%. In particular, when the M.P.V.C. exceeds the critical M.P.V.C. (the 'conventional' critical pigment volume concentration with reference to the matrix composition) the paint films have outstanding hiding power. At lower values of M.P.V.C. the opacity is significantly reduced and at higher than about 75% M.P.V.C. the films are usually too low in scrub resistance to be useful. The upper limit of 75% depends to a degree on the nature of the particular matrix and remembering that acceptable scrub resistance is a subjective judgement, the upper limit for a particular formula may well lie within the region of from 72-78%.

In general, we have found that to ensure optimum opacity and satisfactory mechanical strength in these paints, the granules should comprise about 20-60% by volume of vesicles and relating this to our preferred G.V.C. limits of 35-50% this means that the dry film will contain from about 7 to less than about 30% by volume of vesicles provided by the granules.

The paints are readily prepared by stirring granules into the paint vehicle, which consists of the matrix in solution or disperse form in a suitable volatile liquid.

The vesiculated polymer granules of this invention may be incorporated in polymer to be formed into film by casting, extrusion or other processes. Where the film is to be cast from a solution of the polymer the granules must not be dissolved by the solvent of the solution. Where the film is to be formed by extrusion the polymer of the granules must have a softening point above the extrusion temperature. Granules of thermoset or cross-linked polymer are particularly useful in proportions of up to 25% by volume of the film. Preferably the granules are from 1 – 50 micron in diameter. The vesiculated granules may also be incorporated in bulk polymer in the form of castings, mouldings and extrusions in proportions of up to 60% by volume of the castings, mouldings, or extrusions. The vesiculated granules, preferably of diameters less than 50 micron, may be used as filler in paper manufacture.

The invention is illustrated by the following examples in which all parts are given by weight.

EXAMPLE 1

Preparation of vesiculated poly(styrene) granules with a volume average diameter of about 15 micron and containing approximately 50% by volume of one micron aqueous vesicles. A block of vesiculated poly(styrene) is first formed and then ground to the required granule size.

A surface active agent was prepared by reacting 19.7 parts of a solid copolymer of styrene/4-vinyl pyridine (42.9/2.5 by weight), 79.0 parts of propane sultone in a reaction vessel for three hours at 105°C.

To 22.0 parts of the above solution was added 22.0 parts of styrene and 1.1 parts of azodiisobutyronitrile. To this mixture was added slowly with continual high speed mechanical mixing 54.9 parts of a 2% aqueous solution of a grade of hydroxyethyl cellulose which, as a 1% solution in water had a viscosity of about 200 poise at 25°C.

A white, viscous emulsion of aqueous liquid in styrene was formed and this polymerized on heating at 95°C for five hours to a block of vesiculated poly(styrene) in which the vesicles were filled with the aqueous liquid. The polymeric block was broken up and ground in water in a laboratory pebble mill until the volume average diameter of the granules determined by microscopic examination was approximately 15 micron. The average vesicle diameter was similarly estimated to be about 1 micron and the calculated vesicle volume 50% of the granules. Although of somewhat irregular structure, the granules were of a broadly chunky or spheroidal shape.

The suspension of granules in water from the mill was concentrated by filtration to a solids content of 30.2% by weight (determined by heating for 60 minutes in an air oven at 150°C) to provide a slurry of granules indentified as Granules Slurry No. 1.

EXAMPLE 2

Preparation of vesiculated polymer granules similar to those of example 1 but in which the vesicles comprise aqueous liquid and r-titania pigment.

A suspension of vesiculated granules in water was prepared by the general method of example 1 but replacing the 54.9 parts of 2% hydroxy ethyl cellulose of that example with a suspension of 38 parts of r-titania pigment in a mixture of 1.12 parts of sodium hexametaphosphate, 1.1 parts of hydroxyethyl cellulose (viscosity grade as example 1) and 62 parts of water.

The volume average diameter of the granules was estimated by microscopic examination to be about 15 micron and the shape similar to the granules of example 1. Electron micrographs confirmed the presence of r-titania within the vesicles, which had an average diameter of approximately 1 micron and maximum diameter less than 5 micron. The pigment volume concentration in the vesicles was estimated to be about 13% and the vesicle volume was approximately 52% of the total granule volume.

The suspension was concentrated to a solids content of 39.5% by filtration to provide a slurry of granules identified as Granules Slurry No. 2.

EXAMPLE 3

In this example is described the preparation of vesiculated polystyrene granules by the emulsification of water droplets in styrene in the presence of a stabiliser, and the subsequent emulsion polymerization of the styrene in an aqueous phase.

A latex of a 95/5 styrene/dimethyl-amino-ethyl-methacrylate (DMAEM) copolymer quaternised with benzyl chloride (10.4 parts) in water (51 parts) stabilised with cetyl trimethyl ammonium bromide (0.53 parts) was mixed, using a high speed stirrer, with styrene (32 parts), divinyl benzene (3.6 parts), azodiisobutyronitrile (1.3 parts), sorbitan monostearate (3.0 parts), to produce a dispersion of water in monomer in which the disperse phase particles were about 2 micron in diameter and essentially free of particles greater than 3 micron diameter.

This dispersion was then emulsified in an aqueous phase consisting of partially hydrolysed poly(vinyl acetate) comprising approximately 20% of residual vinyl alcohol units and with a wt. avg. molecular weight of about 125,000 (50 parts of a 10% by weight solution in water), hydroxy ethyl cellulose (50 parts of a 2.5% by weight solution in water) and water (165 parts) using a conventional stirrer so as to avoid breakdown of the water in monomer dispersion. The emulsified particles of water-containing monomer were of diameter approximately 15 micron. The emulsion was heated in a closed pressure vessel at 90°C for three hours in a water bath to polymerize the particles of monomer. The resulting vesiculated polymer granules were added to water (45 parts), agitated and then allowed to settle to be recovered by decantation. Porosity measurements indicated that each granule had a vesicle volume of 21% of the total volume of the granule. It was confirmed that the average diameter of the granules and the average diameter of the vesicles were substantially the same as the average diameters of the emulsified water in monomer particles and disperse water particles respectively.

The granule diameter may be varied by varying the rate of stirring. At lower rates of stirring granules of diameter up to 500 micron were obtained with vesicle size 2 – 3 micron. The larger size granules contained a higher volume of vesicles, up to 60% by volume in the case of granules of diameter 500 micron. At a higher rate of stirring the granule size was reduced to about 5 micron with a corresponding reduction in vesicle size. The volume of vesicles in the granules may also be varied by varying the proportion of water dispersed in the monomer.

EXAMPLE 4

In this example there is described the preparation of vesiculated polystyrene granules in which pigment has been incorporated into the vesicles.

Rutile titanium dioxide (30 parts) was efficiently dispersed in water (20 parts) in the presence of sodium hexametaphosphate (0.4 part). Sufficient water was then added to this dispersion to provide the relative volume of pigment, based on the total volume of pigment and water, required in the final vesicle. In this case the pigment content of the vesicle was to be 10% by volume and the above dispersion (25.2 parts) was mixed with water (10 parts) to provide this pigment content, together with 0.880 ammonia (1 part).

23 parts of 95/5 styrene/hydroxyethyl methacrylate copolymer in which each hydroxyl group had been reacted with maleic anhydride to produce a half ester, were dissolved in a mixture of azodiisobutyronitrile (1.3 parts), styrene (32 parts), and divinyl benzene (3.6 parts), and into the produce was emulsified the above aqueous pigment dispersion using a high speed stirrer. The resulting emulsion was then emulsified in an aqueous phase consisting of a partially hydrolysed poly(vinyl acetate) according to example 3 (50 parts of 10% by weight solution in water), hydroxyethyl cellulose (50 parts of a 2½% by weight solution in water) and water (165 parts) using a conventional stirrer. The final emulsion was polymerized in a closed pressure vessel heated at 90°C for three hours in a water bath. The resulting spheroidal pigmented granules were washed and decanted. The average granule diameter was estimated to be 12 micron with a maximum diameter of 18 micron and the average vesicle diameter to be 2 micron. The vesicle volume was found to be 34% based on the total volume of granule.

It was confirmed by the use of the scanning electron microscope that pigment was present in the vesicles.

Repeating this process but varying the pigment content of the vesicle, suitable adjustment of the proportion of titanium dioxide in the initial pigment dispersion and varying the average granule and vesicle diameters by adjustment of the rates of stirring employed, granules with the following characteristics were prepared:

| Average granule diameter micron | Average vesicle diameter micron | Vesicle volume % | Pigment content as % of vesicle volume |
|---|---|---|---|
| 14 | 3 | 27 | 0.5 |
| 15 | 3 | 23 | 1.1 |
| 18 | 3–4 | 25 | 7.5 |
| 15 | 3 | 22 | 5.0 |
| 12 | 2 | 20 | 10.0 |
| 20 | 4–5 | 16 | 26.5 |
| 22 | 4 | 12 | 40.0 |
| 20 | 4 | 25 | 11.0 |

The results in the table above show that by adjusting the manufacturing procedure pigment loadings of up to 40% by volume could be introduced into the vesicles of these granules, all of the vesicles having maximum diameters of less than 20 micron. The particle/mean vesicle dia. ratios of samples 1, 3 and 6 of the table were measured photomicrographically to be approximately 5/1, although the ratios calculated from the estimated average granule and vesicle diameters were marginally lower.

EXAMPLE 5

In this example there is described the preparation of vesiculated polystyrene granules in which the polymer has been pigmented.

Rutile titanium dioxide (13.6 parts) was efficiently dispersed in a mixture of divinyl benzene (3.6 parts) and styrene (32 parts) in which had been dissolved 23 parts of the copolymer half-ester described in example 4. Azodiisobutyronitrile (1.3 parts) was then added to the dispersion and the dispersion emulsified with wtaer (22 parts) and 0.880 ammonia (1 part) using a high speed stirrer.

The resulting emulsion was then emulsified in an aqueous phase containing a partially hydrolysed poly(vinyl acetate) according to example 3 (50 parts of a 10% by weight solution in water), hydroxyethyl cellulose (50 parts of a 2½% by weight solution in water) and water (165 parts) with a conventional stirrer. This emulsion was polymerized at 90°C for three hours in a closed pressure vessel.

The resulting vesiculated polystyrene granules were washed in water by decantation.

The granules contained 5% of pigment by volume based on the volume of polymer in the granule and the use of the scanning electron microscope confirmed that the the pigment was present in the polymer rather than in the vesicles.

It was estimated that the average granule diameter was 22 micron, the average vesicle diameter was 4 micron and the maximum vesicle diameter was less than 12 micron. The vesicle volume of the granules was 16% based on the total granule volume.

The process was repeated using different amounts of titanium dioxide and stirring speeds to give granules with the following characteristics:

Sample 1 : Average granules diameter 15 micron, average vesicle diameter approximately 3 micron, vesicle volume 20%, maximum vescile diameter 8 micron, polymer 0.27% pigment by volume.

Sample 2 : Average granule diameter 30 micron, average vesicle diameter 3 micron, vesicle volume 18%, maximum vesicle size about 10 micron, polymer 25% pigment by volume.

EXAMPLE 6

In this example there is described the preparation of vesiculated poly(styrene) granules with a volume average diameter of about 15 micron and in which both the vesicles and the polymer contain r-titania pigment.

A surface active agent was prepared by reacting a styrene/methacrylic acid copolymer (25.8/0.74 by weight) with 0.4 parts of a condensate of epichlorhydrin and diphenylolpropane which had an epoxide equivalent of about 190 and a viscosity of 125 poise at 25°C. The agent was prepared as a 32.9% by weight solution in styrene which had a viscosity of 6.6 poise at 25°C.

Using a high-speed mixer, 25.0 parts of r-titania pigment were dispersed into a mixture of 17.5 parts of the above solution and 12.5 parts of styrene to give dispersion (a).

A suspension of 22.5 parts of r-titania pigment in a mixture of 18.9 parts of water and 3.6 parts of triethanolamine was emulsified into dispersion (a) using a high-speed mixer, to form a viscous, white emulsion, dispersion (b).

Dispersion (b) was added in bulk to a solution of 0.45 parts of hydroxyethyl cellulose (viscosity grade as in example 1) and 0.6 parts of an 88% hydrolysed grade of poly(vinyl acetate) of weight average molecular weight approximately 125,000 in 69.95 parts of water. The mixture was mechanically stirred at a rate which formed in 3 minutes emulsified particles of dispersion (b) having a volume average particle diameter of about 15 micron; dispersion (c).

To dispersion (c) was added 0.75 parts of azodiisobutyronitrile and the styrene polymerized by heating the charge to 70°C in a reaction vessel fitted with a stirrer and reflux condenser, for ten hours. The charge was then diluted with 2000 parts of water and allowed to settle for two days. The sedimented granules were concentrated to an aqueous slurry of 34.2% by weight solids content as determined by the method of example 1.

Microscopic examination of the granules confirmed the presence of r-titania in both the polymer and the vesicles, the volume average diameter of the granules being approximately 15 micron.

It was estimated that the granules contained approximately 30% by volume of vesicles and that the vesicles contained of the order of 15% by volume of r-titania, The average vesicle size was estimated by microscopic examination of dispersion (b) to be about 1 micron and the maximum vesicle diameter about 3 micron.

EXAMPLE 7

In this example there is described the preparation of vesiculated unsaturated polyester/styrene granules by a method similar to that used in example 3.

To 30 parts of a 58% solution in styrene of an unsaturated polyester based on fumaric acid, phthalic anhydride and propylene glycol (approximately 3:1:4 by mole) was added 1.8 parts of an 86/14 copolymer of vinyl acetate and dimethylaminoethyl methacrylate quaternised with benzyl chloride, and 0.6 parts of benzoyl peroxide. Water (15 parts) was added to this solution using a highspeed stirrer to produce a dispersion of water droplets in the polymer solution, in which the disperse phase water droplets had a maximum diameter of 4 micron.

The dispersion was then emulsified into an aqueous phase consisting of a partially hydrolysed poly(vinyl acetate) according to example 3 (20 parts of a 13.6% by weight solution in water,) hydroxyethyl cellulose (100 parts of a 2.25% by weight solution in water) and water (230 parts) to give emulsified particles of water-containing polyester/styrene droplets of average diameter 25 micron. The emulsion was heated in a closed pressure vessel at 90°C for 5 hours. The resulting vesiculated polymer granules were washed with water and recovered by settling.

The vesicles in the granules occupied approximately 40% of the total volume of the granules, and had an average diameter of approximately 3 micron. The average granule diameter was 25 micron.

On repeating the process and incorporating pigment in the vesicle by the process of example 4, granules were obtained having the following characteristics; granule diameter 40 micron, average vesicle diameter 5 micron, vesicle volume 15.9%, pigment content 10% of vesicle volume. In both samples the maximum vesicle diameter was less than 12 micron.

EXAMPLE 8

This example describes the preparation of vesiculated epoxy-amide granules using a method similar to that described in example 3 but in which water has been replaced by aliphatic hydrocarbon.

100 parts of the liquid epichlorhydrin condensate used in example 6 were well mixed with 100 parts of a liquid polyamide having free amine groups (amine value 400 equivalent mgms KOH/gm.) In the resulting liquid was finely dispersed a solution of 1:1 graft copolymer of methyl methacrylate backbone of molecular weight 5000 and side chains of polyhydroxystearic acid molecular weight 1500(12.3 parts of a 32.5% solution in aliphatic hydrocarbon) and then aliphatic hydrocarbon (b.p. 130°C) (62 parts).

This dispersion was then itself dispersed in a mixture of aliphatic hydrocarbon (300 parts) and graft copolymer as used above (9.24 parts) to produce aliphatic hydrocarbon-containing droplets of epoxy-amide resin of average diameter 10-20 micron. The emulsion was agitated for 2-3 hours to maintain discrete droplets during polymerization at room temperature.

The resulting vesiculated granules were separated and it was estimated that the average vesicle diameter was 1 micron and the average granule diameter was 10-20 micron. The granules comprised about 25% by volume of vesicle of maximum diameter less than 3 micron.

EXAMPLE 9

This example describes the preparation of vesiculated cellulose acetate butyrate granules.

5 parts of white spirit were added to a solution of 10 parts of cellulose acetate butyrate in 90 parts ethyl acetate. The solution was then dispersed in an aqueous phase consisting of water (16.5 parts) a partially hydrolysed poly(vinyl acetate) according to example 3 (50 parts of a 10% solution in water), hydroxy ethyl cellulose (50 parts of a 2½% solution in water), and ethyl acetate (26.5 parts).

The dispersion of the cellulose acetate butyrate solution was diluted with a larger quantity of water to leach out ethyl acetate whereupon the white spirit precipitated out in the cellulose acetate butyrate to form small vesicles.

The vesiculated granules were isolated and estimated to have an average vesicle diameter of 1 micron and an average granule diameter of 5-10 micron. The granules contained about 40% by volume of vesicles which had substantially uniform diameters of about 1 micron.

EXAMPLE 10

In this example is described the preparation of vesiculated methyl methacrylate copolymer granules by the dispersion of water droplets in a methyl methacrylate copolymer solution and the subsequent emulsification of this dispersion into a water phase, and extraction of the solvent.

16.2 parts of an 86/14 copolymer of methyl methacrylate and dimethyl amino ethyl methacrylate quaternised with benzyl chloride, were dissolved in toluene (40.0 parts). The solution was added to water (50.0 parts) using a high dispersion speed stirrer to produce a dispersion of water droplets in the polymer solution in which the disperse phase water particles had a maximum diameter of 4 micron.

This dispersion was emulsified in an aqueous phase consisting of a partially hydrolysed poly(vinyl acetate) according to example 3 (11 parts of a 13.6% by weight solution in water), hydroxy ethyl cellulose (55 parts of a 2.25% by wt. soln. in water) and water (133 parts) using a conventional stirrer. The emulsified particles of water-containing polymer solution were of average diameter approximately 35 micron. The toluene was extracted from the particles by stirring the emulsion with an aliphatic hydrocarbon (500 parts), and the resulting vesiculated polymer granules diluted with water (4000 parts) recovered by decantation and dried. Porosity measurements indicated that the granules had a vesicle volume of 61% of the total volume of the granules. The maximum diameter of the vesicles was 4 micron and the average granule diameter was approximately 25 micron.

EXAMPLE 11

The process of example 10 was repeated but instead of the methyl methacrylate copolymer, a commercial grade of chlorinated rubber was used. The vesicles occupied 39% of the total granule volume, and had a maximum diameter of 10 micron. The average granule diameter was 20 micron and the average vesicle diameter about 4 micron.

EXAMPLE 12

In this example granules were prepared by the process of example 10 but instead of the methyl methacrylate copolymer, a commercial grade of vinylidene chloride acrylonitrile copolymer was used, and instead of toluene, a mixture of amyl acetate and methyl ethyl ketone (120 parts of a 1:1 mixture) was used. Triethanolamine (0.5 parts) was added to the water dispersed into the polymer solution. Instead of being extracted the acetate and ketone were distilled off. The vesicles in the granules occupied approximately 30% of the total granule volume, and had a maximum diameter of 20 micron. The average granule diameter was 60 micron and the average vesicle diameter about 11 micron.

EXAMPLE 13

In this example is described the preparation of vesiculated styrene copolymer granules by a process similar to that given in example 10, but extracting the solvent by dilution with an excess of water. By dispersing a large quantity of water into the polymer solution highly vesiculated granules were obtained.

40 parts of a 92/8 copolymer of styrene and dimethyl amino ethyl methacrylate quanternised with benzyl chloride were dissolved in butyl acetate (100 parts) and water (300 parts) was slowly added using a high-speed mixer to produce a dispersion of water droplets in the polymer solution.

This dispersion was emulsified in an aqueous phase consisting of a partially hydrolysed poly(vinyl acetate) according to example 3, (28 parts of a 13.6% by weight solution in water), hydroxy ethyl cellulose (140 parts of 2.25% by weight solution in water, water (332 parts) and butyl acetate (6 parts) to give emulsified particles of water-containing polymer solution of average diameter 200 micron. Butyl acetate was extracted from the particles by diluting the emulsion with water (3000 parts), and the resulting vesiculated granules were allowed to settle, recovered by decantation and dried. Porosity measurements indicated that the granules had a vesicle volume of 76% of the total volume of the granules. The maximum diameter of the vesicles was 5 micron, and the average granule diameter was approximately 150 micron.

The process was repeated but the amounts of styrene copolymer and butyl acetate in the initial solution, and the amounts of water dispersed into the solution were those listed below. Furthermore, the water-containing polymer solution was emulsified into an aqueous phase consisting of hydroxyethyl cellulose (25 parts of a 2.25% by weight solution in water), water (275 parts) and butyl acetate (3 parts). The average granule diameter, the maximum vesicle diameter and the vesicle volume concentration of the granules obtained were as follows:

| Parts Styrene Copolym. | Parts butyl acetate | Parts water dispersed | Average granule dia. | Maximum vesicle dia. | Vesicles vol. of granules |
|---|---|---|---|---|---|
| 6.7 | 40.0 | 133 | 150 micron | 10 micron | 89% |
| 5.0 | 42.0 | 150 | 75 micron | 20 micron | 96% |

The vesiculated granules having a vesicle volume of 96% were extremely fragile. The average vesicle diameters were 7 and 13 micron respectively.

EXAMPLE 14

In this example is described the preparation of vesiculated poly (cyclohexylmethacrylate) granules by a process incorporating elements of examples 3 and 12.

11.5 parts of a 92/8 copolymer of cyclohexylmethacrylate and dimethyl amino ethyl methacrylate quaternised with benzyl chloride and azodiisobutyronitrile (11 parts) were dissolved in a mixture of cyclohexyl methacrylate (36 parts) and toluene (40 parts), and water (70 parts) was slowly added using a high-speed mixer to produce a dispersion of water droplets in the polymer solution.

The dispersion was then emulsified into an aqueous phase consisting of a partially hydrolysed poly(vinyl acetate) according to example 3 (20 parts of a 13.6% by weight solution in water), hydroxyethyl cellulose (100 parts of a 2.25% by weight solution in water) and water (230 parts) to give emulsified particles of water-containing polymer solution of average diameter 20 micron. The emulsion was heated in a glass vessel fitted with stirrer and condenser, and the toluene was slowly removed by distillation over a period of 4 hours. Polymerization of the monomer occurred simultaneously.

The resulting polymer granules were diluted with water allowed to settle and recovered by decantation. Porosity measurements indicated that the granules had a vesicle volume of 15% of the total volume of the granules. The maximum diameter of the vesicles was 4 micron with a mean diameter of under 2 micron and the average granule diameter was approximately 10 micron.

EXAMPLE 13

This example describes the preparation of vesiculated methyl methacrylate copolymer granules by the dispersion of aqueous droplets in a methyl methacrylate copolymer solution and the subsequent emulsification of this dispersion into a water phase and extraction of the solvent. The vesicles contain the fungicide sodium pentachlorphenate.

A slurry of vesiculated granules was prepared by the general method of example 10 but replacing all of the water of that example with an equal weight of a 2% solution in water of sodium pentachlor phenate. The slurry was allowed to settle, the supernatant liquid was decanted and the granules washed and dried. The maximum diameter of the vesicles was about 5 micron and the average granule diameter approximately 25 micron. The vesicle volume of the granules was estimated to be about 60% of the total granule volume.

A slurry of the granules in distilled water was allowed to stand for 24 hours and the presence of sodium pentachlor phenate leached into the water confirmed analytically. The granules were transferred into a fresh quantity of distilled water and the process repeated. After several days, sodium pentachlor phenate continued to leach from the granules into the freshly added water. That is, despite the high solubility of sodium pentachlor phenate in water, its availability was modified by placing the phenate within the vesicles of the granules.

EXAMPLE 16

Preparation of an aqueous latex coating composition comprising vesiculated granules from example 1. The pigment volume of the composition is 30% and the volume of vesiculated granules 86%; as defined above.

A mill-base was prepared by blending together for 30 minutes in a high-speed mixer the following components:

| | |
|---|---|
| r-titania | 8.4 parts |
| 25% (w/w) aqueous solution of a commercial anionic polymeric surface active agent | 0.4 parts |
| 1,2-propylene glycol | 2.9 parts |
| commercial anti-foaming agent (sodium salt of condensed aryl sulphonic acid) | 0.1 parts |

To the mill-base so-prepared were added with stirring and in the order given, the following:

| | |
|---|---|
| aqueous acrylic copolymer latex, 46.5% solids (wt.) and particle diameter approximately 0.4 micron | 12.20 parts |
| quaternary ammonium type anti-microbial agent | 0.04 part |
| water | 1.30 parts |
| ethylene glycol mono-n-butyl ether | 0.60 part |
| di-octadecyl sodium sulphosuccinate | 0.04 part |
| granules of example 1 | 74.00 parts |

The paint so-prepared was brushed out onto a coloured non-porous substrate and dried to a white, opaque film. the opacity was greater than that associated with a similar film of the same overall composition and pigment content but containing no vesiculated granules.

EXAMPLE 17

Preparation of an aqueous latex coating composition comprising vesiculated granules from example 2. The pigment volume of the composition is 33% and the volume of vesiculated granules 88%; as defined above.

A mill-base was prepared by blending together for 30 minutes in a high-speed mixer the following components:

| | |
|---|---|
| r-titania | 7.0 parts |
| 25% (w/w) aqueous solution of sodium hexametaphosphate | 0.1 part |
| water | 2.1 parts |

To the mill-base so-preared were added with stirring and in the order given, the following:

| | |
|---|---|
| anionically stabilised acrylic copolymer latex solids 46.5% and particle size approximately 0.1 micron | 8.5 parts |
| water | 7.1 parts |
| granules of example 2 | 75.2 parts |

The paint so-prepared was brushed out onto a coloured, non-porous substrate and dried to a white, opaque film. The opacity was greater than that associated with a similar film of the same overall composition and pigment content but containing no vesiculated granules.

EXAMPLE 18

Preparation of an aqueous latex coating composition comprising vesiculated granules from example 6. The pigment volume of the composition is 29% and the volume of vesiculated granules 77%; as defined above.

To 79.8 parts of granules made in example 6 (aqueous slurry) was added 7.0 parts of r-titania pigment and the mixture subjected to high-speed stirring for 10 minutes. The stirring speed was then reduced and 10.4 parts of an ionically stabilised acrylic copolymer aqueous latex (solids 46.5%, approximate particle diameter 0.1 micron) together with 2.7 parts of a 2.5% (w/w) aqueous solution of hydroxyethyl cellulose (viscosity grade as example 1) added.

The paint so-prepared was brushed out onto a coloured, non-porous substrate and dried to a white matte film of high-opacity.

EXAMPLE 19

A coating composition was prepared by first dispersing rutile titanium dioxide (62 parts) in water (160 parts) in the presence of sodium hexametaphosphate (0.6 part) and then mixing the dispersion with a commercially available acrylic latex (258 parts of a 46% solids latex; AC - 34 ex Rohm and Haas).

A portion of the paint was well mixed with vesiculated pigmented granules made according to example 4, the volume proportion of granules being equal to the total solids of the paint. This granule-containing paint was applied as a film to a glass surface and compared for opacity with a similar film of the paint which did not contain granules. The scatter coefficient was determined using the Kubelka Munk method and this expressed in terms of unit pigment volume concentration. In this case the ratio of scatter coefficient to pigment volume was 243 compared with a ratio of 137 for the standard paint.

EXAMPLE 20

Preparation of four matt aqueous latex paints comprising different vesiculated polymer granules.

Titanium dioxide (12.1 parts) and sodium hexametaphosphate (0.06 part) were added to an aqueous slurry of vesiculated granules (66.4 parts, granule content 18%) and the mixture stirred with a high-speed mechanical disc agitator for 30 minutes. Silica (0.84 part) and 1,2-propylene glycol (3.40 parts) were added and stirring continued for 10 minutes, when the stirring speed was lowered to reduce aeration and an aqueous latex of acrylic copolymer (17.2 parts, 46.5% copolymer) added. (Rhoplex AC - 35 of Rohm and Haas Co., "Rhoplex" being a registered trade mark).

The paints differed in using granules of the following characteristics, granules (a) being a preferred type:

| Vesiculated granules | Paint Sample | | | |
|---|---|---|---|---|
| | (a) micron | (b) micron | (c) micron | (d) micron |
| Approx. diameter | 1–48 | 1–128 | 1–45 | 1–45 |
| Vol. average dia. | 25 | 20 | approx. 3 | 25 |
| Vesicle dia. | approx. 1 | approx. 1 | approx. 0.5 | approx. 1.5 |
| Vesicle volume | 50% | 50% | 50% | 50% |
| Elong. at break of polymer | under 10% | under 10% | under 10% | over 80% |
| Composition of polymer in granules | | | | |
| titanium dioxide | 10% by wt. | 10% by wt. | 10% by wt. | 10% by wt. |
| polymer | poly(methylmethacrylate) | poly(methylmethacrylate) | poly(methylmethacrylate) | poly(2-ethyl hexyl acrylate/divinyl benzene (95/5 by wt.) |

All granules had maximum vesicle diamters of less than 5 micron.

Films of each paint were applied by brush to glass panels at a spreading rate of approximately 600 sq.ft. per gallon and allowed to dry in air at 25°C and 50% relative humidity. All compositions formed coherent, dry films in less than one hour. Some properties of the dry films were as follows:

| | Sample | | | |
|---|---|---|---|---|
| | (a) | (b) | (c) | (d) |
| Surface appearance | Uniform, matt | Matt, seedy | Matt, pronounced sheeriness | Matt, uniform |
| Clean-up properties | very good | very good | very good | Poor |

Relative to paint sample (a), the film of paint sample (b) showed some seediness due to the presence at the surface of coarse particles of vesiculated granules. The paint sample (c), which contained an unduly high level of small diameter granules exhibited sheeriness. Although acceptable in other respects, the film of paint sample (d) picked up atmospheric dirt readily. Attempts to remove the dirt by rubbing the film with a wet cloth resulted in marring of the film, in which the dirt appeared to have become firmly embedded. Furthermore, density measurements of the dry film showed it to be of higher density than that predicted, which would appear to be due to collapse of the vesiculated granules as the film dried.

EXAMPLE 21

A coating composition was prepared by dispensing rutile titanium dioxide (12.1 parts) in water (5 parts) in the presence of sodium hexametaphosphate (0.06 parts). The dispersion was then mixed with a latex of a copolymer of vinyl acetate and 2-ethyl hexyl acrylate 85/15(15 parts of latex of 50% solids content).

To half of this coating composition was added a slurry in water of vesiculated granules made by the process described in example 3. (50 parts of slurry of 15% granule content).

To the other half of the coating composition was added a slurry of granules (50 parts of a slurry of 30% granule content) of the same composition and size but containing no vesicles.

The two samples of coating composition were brushed out at rate of 600 sq.ft. per gallon on Morest Charts. The opacity of the film of coating composition containing vesiculated granules was substantially greater than that of the film of the other sample of coating composition.

Similar results were obtained when a latex of poly (styrene butadiene) and a latex of a styrene/acrylic terpolymer were used in place of the acetate/acrylate latex.

Comparative coating composition were also prepared by the above process using the same proportions of vesiculated granules according to the invention and prepared as described in examples 4, 5, 6, 7, 9, 10, 11, 12, and 14 and corresponding non-vesiculated granules. In each case a substantially higher degree of opacity was noted in films of compositions containing vesiculated granules as compared with non-vesiculated granules. The relative opacities of the films comprising vesiculated granules were determined in terms of contrast ratios in the following manner. Each coating composition was applied by brushing to Morest charts at the rate of 600 sq.ft. per gallon and the films allowed to dry hard in air of ambient temperature. The reflectance of incident light on portions of the film overlying white and black areas of the substrate were measured optically and the contrast ratio of the two reflectance values calculated as a measure of opacity. A contrast ratio of 1 corresponds under the condition of this test to complete obliteration of the substrate. The film comprising granules from example 5 had a substantially lower contrast ratio than that of the other film comprising vesiculated granules. Although the diameter of the vesicles in these granules lay within our preferred range of 5 micron maximum the vesicle volume was 16, which is below the lower limit of our preferred range of vesicle volumes.

By way of further comparison the test was repeated replacing the polymeric granules of example 3 with an equal volume of granules of non-vesiculated poly(styrene) and with barytes (a typical extender pigment) of 10–15 micron particle diameter. The results which show the superior opacity conferred by the vesiculated granules, are recorded in the following table:

| From example No. | Granules | | | Opacity of films | | |
|---|---|---|---|---|---|---|
| | Pigment in granules | Vesicle % volume | Mean vesicle dia. micron | Reflect. over white | Reflect. over black | Contrast ratio |
| 3 | No | 21 | 2 | 92.0 | 87.0 | 0.94 |
| 4 | Yes | 34 | 2 | 92.5 | 89.3 | 0.97 |
| 5 | Yes | 16 | 4 | 90.0 | 75.0 | 0.83 |
| 6 | Yes | 30 | 1 | 92.0 | 88.0 | 0.96 |
| 7 | No | 40 | 3 | 92.3 | 89.3 | 0.97 |
| 10 | No | 60 | 2 | 90.0 | 77.0 | 0.87 |
| —* | No | — | — | 86.2 | 68.5 | 0.80 |
| barytes+ | — | — | — | 84.0 | 65.0 | 0.78 |

*Repeat of the test using vesiculated granules according to example 3 but replacing those granules with an equal volume of granules of poly(styrene) of substantially the same dimensions but free of vesicles.

+As above, but using barytes of particle diameter 10–15 micron in place of the non-vesiculated poly(styrene) granules.

EXAMPLE 22

A coating composition was prepared by dispersing rutile titanium dioxide (12.1 parts) in water (5 parts) in the presence of sodium hexametaphosphate (0.06 part). The dispersion was then mixed with a latex of a commercial thermosetting acrylic copolymer (17 parts of latex of 46% solids content).

To half of this coating composition was added a slurry in water of vesiculated granules made by the process described in example 7 (50 parts of slurry of 25% granule content). Hydroxyethyl cellulose (10 parts of an aqueous solution of 2.25% solids content) was also added.

The coating composition was brushed out at a rate of 400 sq.ft. per gallon on a Morest Chart, and after allowing the film to dry at room temperature, it was baked at 100°C for two hours.

The opacity of the film of coating composition was significantly greater than that of a control film prepared from a coating based on the second portion of the above composition in which the vesiculated granules had been replaced on an equal volume basis with granules of similar compositions and size, but containing no vesicles.

EXAMPLE 23

A coating composition was prepared according to example 22 except that the acrylic latex was replaced with a water soluble alkyd (15 parts of alkyd solution of 50% solids content), and no hydroxyethyl cellulose was added.

A film brushed onto a Morest Chart had significantly better opacity on drying at room temperature than a control composition in which the granules were replaced on an equal volume basis with granules of similar composition and size, but containing no vesicles.

EXAMPLE 24

A coating composition was prepared by dispersing rutile titanium dioxide (12.1 parts) in a non-aqueous dispersion in petrol of a 60/40 copolymer of ethyl acrylate and methyl methacrylate (20 parts of the dispersion of 40% solids content).

To half of this coating composition was added 12 parts of dry granules prepared by the process described in example 10 and 50 parts of petrol. The granules were dispersed in the composition using a high-speed stirrer, with the aid of sand. After removing the sand, the paint was sprayed onto a Morest Charat, and allowed to dry at room temperature. The film obtained was more opaque than a film of similar thickness prepared from a composition in which the vesiculated granules were replaced with the same volume of granules of similar composition and size, but containing no vesicles.

A similar result was obtained when the acrylic film-forming dispersion was replaced with a non-aqueous dispersion of a vinyl acetate copolymer.

EXAMPLE 25

A coating composition was prepared by dispersing rutile titanium dioxide (10 parts) in a soya bean oil/glycerol phthalate alkyd (50% oil length) solution in mineral spirits (20 parts of a 40% solution). Dry vesiculated unsaturated polyester/styrene copolymer granules (5 parts) prepared by the method given in example 7, and xylene (10 parts) were added to the dispersion, and the aggregates dispersed with sand using a high-speed stirrer.

After removal of the sand, the composition was brushed onto a Morest Chart at a rate of 600 sq.ft. per gallon. The opacity of this film was significantly higher than a film of the same thickness in which the vesiculated granules had been replaced by an equal volume of granules of the same composition and size, but containing no vesicles.

A similar result was obtained when the alkyd solution was replaced with a mixture of 15 parts of a solution in xylene of a 50:35:15 copolymer of styrene, butyl acrylate and hydroxyethyl methacrylate, of solids content 40%, and 5 parts of a solution in xylene and butanol (1:1) of a butylated melamine formaldehyde resin of solids content 60%. In this case the films were applied to the Morest Charts by spraying, and the coated charts were baked at 150°C for 30 minutes.

Similar results were obtained when the unsaturated polyester/styrene copolymer granules used in these two types of coating compositions were replaced by copolymer granules prepared by the method given in example 8.

EXAMPLE 26

A coating composition was prepared by dispersing rutile titanium dioxide into a solution in a 1:1 mixture of toluene and acetone of a 98/2 methyl methacrylate/methacrylic acid copolymer solution (20 parts of a 40% solution). Dry vesiculated unsaturated polyester/styrene copolymer granules (5 parts) prepared by the method given in example 7, acetone (10 parts), toluene (10 parts) and n-benzyl butyl phthalate (5 parts) were added to the dispersion and the aggregates dispersed by stirring at high-speed with sand.

After removal of the sand, the composition was sprayed onto a Morest Chart and after drying the film at room temperature for one hour the coated chart was baked at 150°C for 30 minutes. The opacity of this film was significantly higher than a film of the same thickness in which the vesiculated granules had been replaced by an equal volume of granules of the same composition and size, but containing no vesicles.

EXAMPLE 27

Coating compositions were prepared by mixing slurries of vesiculated granules (40 parts of the slurry) prepared by the method given in example 13 with a commercial acrylic aqueous latex (20 parts of the latex of solids content 46%). The solids contents of the slurries and the granule porosities and average diameters are given in the table below:

| Porosity of granules % | Average diameter of granules. | Solids Content of Slurry % |
|---|---|---|
| 76 | 150 micron | 7.5 |
| 89 | 150 " | 3.9 |
| 96 | 75 " | 2.4 |

The coating compositions were spread onto wooden panels and allowed to dry. Textured white coatings were obtained. The coating containing the granules whose porosity was 96% of the total volume of the granules had unacceptable mechanical properties, being very easily marred. These granules lie outside the limits of this invention.

EXAMPLE 28

A coating composition was prepared by dispersing rutile titanium dioxide (25 parts) into a solution of a saturated polyester (hydroxyl content 10%) in ethylene glycol monoethyl ether acetate (125 parts of the solution of solids content 30%). Dry vesiculated granules (25 parts) prepared by the method given in example 7 were added to the dispersion, and the aggregates dispersed using sand with a high-speed stirrer.

After removal of the sand hexamethylene diisocyanate adduct (isocyanate content 11.5% dissolved in a 1:1 mixture of ethylene glycol acetate and xylene (75 parts of the solution of solids content 75%) was added. The coating was brushed onto a Morest Chart at a rate of 600 sq.ft. per gallon, and allowed to dry for 72 hours at room temperature. The opacity of the film was significantly higher than a film of the same thickness in which the vesiculated granules had been replaced by an equal volume of granules of the same composition and size, but containing no vesicles.

A similar result was obtained when the saturated polyester solution was replaced with a solution of an epoxy resin (epoxide equivalence 500) in a 3:1 mixture of ethylene glycol monoethyl ether and xylene (125 parts of a solution of solids content 40%), and the hexamethylene diisocyanate adduct solution was replaced with a solution of a polyamide (amine value 215 mgm KOH per gram of polyamide) in a 1:1 mixture of methyl isobutyl ketone, ethylene glycol monethyl ether and xylene (50 parts of the solution of solids content 50%).

EXAMPLE 29

This example illustrated the preparation of paper containing vesiculated granules.

Dry wood pulp (10 parts) was mixed with water (190 parts) and the slurry beaten with a laboratory beater until uniform. A slurry of vesiculated granules (2 parts of the slurry of solid content 25%) prepared by the method given in example 7 was added, and the beating process continued for a further 15 minutes. The slurry was further diluted with water (800 parts) and was fed into a paper-making machine.

The dry paper obtained had higher opacity than a similar composition in which the vesiculated granules had been omitted. Paper containing granules from example 7 in which 10% by volume of pigment was incorporated in the vesicles had a higher opacity, when dry, than the paper made from the pigment-free granules.

EXAMPLE 30

This example illustrates the preparation of a sheet of polyethylene containing vesiculated granules.

Polyethylene granules (98 parts) were blended with dry vesiculated granules (2 parts) prepared by the two method given in example 7. To fully incorporate the vesiculated granules the mixtures were extruded in the form of tubes and fed into a granulator. The products were then extruded in the form of opaque sheets of 1 mm thickness. The sheet comprising vesiculated granules from example 7 in which the vesicles contained 10% by volume of pigment was appreciably more opaque and brighter in appearance than the sheet comprising pigment free granules. A 'control' sheet prepared in a similar manner but containing no vesiculated granules was essentially transparent.

EXAMPLE 31

Preparation of a film of poly(vinyl chloride) comprising vesiculated polymer granules.

The granules used in this example were of unsaturated polyester resin cross-linked by styrene. Their maximum diameter was about 12 micron, mean diameter 5 micron, vesicle diameter of 0.5 micron and vesicle volume 30%. The granules had a residual moisture content of 1.7% by weight.

The poly(vinyl chloride) was a moulding grade of powdered homopolymer with a K value of 57 and relative viscosity at 25°C as a 0.5% by weight solution in ethylene dichloride of 1.4. The particle size of the powder was:

less than 2% retained on a 72 mesh B.S. sieve
97% retained on a 200 mesh B.S. sieve.

A mixture of

| | | |
|---|---|---|
| poly(vinyl chloride) | 30.0 | parts |
| tribasic lead stearate | 0.9 | " |
| dibasic lead stearate | 0.3 | " |
| lead stearate | 0.2 | " |
| polymer granules | 7.5 | " | was compounded in a Brabender mixer at 225°C for 7 minutes. A portion of this mixture was pressed into a film of thickness 250 micron at 175°C and 470 p.s.i. pressure.

A 250 micron film was prepared as a control using the same ingredients as above but omitting the polymer granules.

The control film was translucent, whereas the film containing vesiculated granules was opaque.

EXAMPLE 32

Preparation of a film of poly(vinyl chloride) similar to that of example 31.

| A mixture of | | |
|---|---|---|
| poly(vinyl chloride)as example 31 | 100.0 | parts |
| di-iso-octyl phthalate | 45.0 | " |
| tribasic lead stearate | 3.0 | " |
| dibasic lead stearate | 1.0 | " |
| lead stearate | 0.6 | " |
| polymer granules as example 31 | 40.0 | " | was compounded in a Brabender mixer at 190°C for 5 minutes. A portion of this mixture was pressed into a film of 200 micron thickness at 160°C and 450 p.s.i. pressure.

A 200 micron film was prepared as a control using the same ingredients as above but omitting the polymer granules.

The control film was translucent, whereas the film containing vesiculated granules was opaque.

As an indication of the usefulness of the polymer comprising vesiculated granules in hard, opaque castings, the tensile modulus of the film comprising granules was determined to be 3.45 kg. cm$^{-2}$ at 2% elongation, the corresponding figure for the control film being 0.24 kg cm$^{-2}$.

EXAMPLE 33

The effect on the properties of a paint comprising vesiculated polymer granules of varying the ratio of granule diameter to mean vesicle diameter.

Four samples of vesiculated polymer granules were prepared from unsaturated polyester resin cross-linked by reaction with styrene monomer by the general method of example 7. The granules were collected as an 11% by weight slurry of granules in water. The granules in each sample were approximately 13 micron diameter and contained 30% by volume of vesicles, estimated by microscopic examination of sectioned granules. The mean diameters of the vesicles were similarly estimated to be as follows:

| Sample No. | Mean Vesicle dia. | | Granule vesicle ratio |
|---|---|---|---|
| 1 | 0.4 | micron | 32.5 |
| 2 | 0.6 | " | 21.7 |
| 3 | 2.0 | " | 6.5 |
| 4 | 5.0 | " | 2.6 |

Four paints were prepared from these granules to the following composition:

| granules (slurry as above) | 100.00 | parts |
|---|---|---|
| rutile titanium dioxide | 16.00 | " |
| sodium hexametaphosphate | 0.05 | " |
| high viscosity grade hydroxy-ethyl cellulose | 0.30 | " |
| vinyl acetate copolymer latex * | 50.00 | " |

* The latex used was a vinyl acetate/2-ethyl hexyl acrylate copolymer (80:20 by wt.) aqueous latex of 55% by weight total solids.

The paints were prepared in conventional manner using a high-speed stirrer and adding the latex last at low stirring speed.

The paints so-formed were applied to Morest charts by brushing at a spreading rate of about 600 sq.ft. per gallon and allowed to dry in air. The opacities of the dry films were compared with a set of standards which had been given an aribtrary rating of 0 (no opacity) to 16 (complete obliteration), in approximately linear increments of opacity. The results were as follows:

| Paint from Granule No. | Opacity Rating |
|---|---|
| 1 | 6-7 |
| 2 | 6 |
| 3 | 5 |
| 4 | 3-4 |

The opacity of the paint comprising granules No. 4 was rated as being unacceptable. These granules conformed to the requirements of a maximum vesicle diameter of 20 micron and a preferred mean vesicle diameter of 5 micron maximum but had a lower granule diameter/mean vesicle diameter ratio than 5:1.

Similar results were obtained when the granules were dried and then evaluated in an alkyd resin-based enamel of the following composition:

| rutile titanium dioxide | 56.8 | parts |
|---|---|---|
| long oil safflower alkyd resin (as 70% solids solution in mineral spirits) | 90.0 | " |
| mineral spirits | 50.0 | " |
| granules | 24.3 | " |

EXAMPLE 34

Effect of granule volume concentration on the properties of matte paints comprising vesiculated polymer granules.

A series of paints was prepared from the following materials:

granules - 15 micron volume average diameter and less than 30 micron maximum diameter cross-linked polyester resin vesiculated granules of 0.7 micron mean vesicle diameter and 45% vesicle volume. The granules comprised 20% by weight of rutile titanium dioxide pigment which was distributed throughout the vesicles. The granules had an essentially continuous, non-porous polymer surface.

Latex - A commercial vinyl acetate/acrylate copolymer aqueous latex of 55% by weight total solids.

The paints were prepared at a range of granule volume concentrations as shown in the accompanying table and at a constant M.P.V.C. of 30% using rutile titanium dioxide as the sole pigment in the latex.

The titanium dioxide was dispersed in a 15.7% by weight slurry of the appropriate granules in water using a conventional sand mill and in the presence of 0.5% by weight of sodium hexametaphosphate, based on the weight of pigment. The latex was then added with slow stirring and the viscosity adjusted as required to give a suitable rheology for brush application by the addition of extra water.

The paints were tested for opacity by the method described in example 33 and for re-coating properties by practical brushing trials on hardboard sheets. Uniformity of appearance of the dry films, noting in particular any irregularities of gloss level, was judged visually from the dry paint films. The scrub-resistance was measured by the American Society for Testing and Materials method D 2486-69T.

| Paint No. | % Gran. vol.conc. (G.V.C.) | Uniformity of appear. | Opacity | Recoat Props. | Scrub * Resist. |
|---|---|---|---|---|---|
| 1 | 0 | Poor, very uneven | 8 | Excellent | 800 |
| 2 | 20 | Sheery | 8 | " | 650 |
| 3 | 40 | Good | 9 | " | 400 |
| 4 | 50 | Excellent | 10–11 | Good | 250 |
| 5 | 60 | " | 9 | Fair | 150 |
| 6 | 70 | " | 8 | Poor | 50 |

* Scrub cycles to film failure.

The results show that at a G.V.C. below and above the range of 25 to 60 the paints were of unacceptable appearance and mechanical properties respectively. Compositions within our preferred G.V.C. range of 35 to 50 had good mechanical properties and a superior combination of appearance and opacity to the other paints in the series.

EXAMPLE 35

Effect of matrix pigment volume concentration on the properties of matte paints comprising vesiculated polymer granules.

A similar series of paints to that of example 34 was prepared from the same titanium dioxide pigment, granules and latex. The paints were, however, prepared at a constant granule volume concentration of 45% and the matrix pigment volume concentration (M.P.V.C.) was varied by adjusting the proportion of titanium dioxide dispersed therein. Testing of the paints was carried out as in example 34 within the following results.

| Paint No. | M.P.V.C. | Opacity | Scrub Res | Recoat Props. |
|---|---|---|---|---|
| 1 | 3 | 3 | 500 | Excellent |
| 2 | 10 | 6 | 400 | " |
| 3 | 20 | 7 | 400 | " |
| 4 | 30 | 9–10 | 350 | " |
| 5 | 40 | 15 | 200 | Fair |
| 6 | 50 | 17 | 100 | Poor |
| 7 | 80 | 20 | 10 | Very poor |

The critical pigment volume concentration of the matrix was determined to be about 35% so that paints 5, 6 and 7 exceed this critical value. Hence they represent compositions in which a balance between film integrity and opacity has been struck in favour of high opacity. Paint 1, which lies below our preferred M.P.V.C. range, had very poor opacity, while paint 7, which exceeded our upper M.P.V.C. limit for high opacity films, showed unacceptably poor film integrity.

EXAMPLE 36

Effect of some granule variables on the opacity of dry paint films in which the granules are incorporated.

Spheroidal granules of an unsaturated polyester resin cross-linked by reaction with styrene monomer were prepared as a 23% by weight slurry in water. The granules had a volume average diameter of 13 micron (all granules were less than about 32 micron diameter), a vesicle volume of 50% and comprised vesicles of 0.5 micron mean diameter containing approximately 20% by volume of titanium dioxide pigment. The granules had an essentially non-porous outer surface and as a check on their vesicle volume, estimated initially from an electron microscope examination, this was re-calculated in the following manner.

To 34.44 parts of an acrylic latex of 46.5% by weight solids was added with mixing 5.22 parts of the slurry of granules. A thick film was built up on a glass plate by depositing with a doctor blade and drying on it successive layers of the above mixture. The dried film was removed from the glass and its density measured using a specific gravity bottle, in which the film was immersed in water. The results were as follows:

| | |
|---|---|
| weight of film | 0.6146 gm. |
| volume of film | 0.556 ml. |
| specific gravity of solid acrylic film-forming polymer | 1.124 |

The density of the granules was calculated from these figures to be 0.91 gm. per $cm^3$, from which their calculated vesicle volume is about 50%.

The slurry of granules was used to prepare a paint by the general method of example 34 using tthe following ingredients.

| | |
|---|---|
| granules slurry (as above) | 200.0 parts |
| titanium dioxide pigment | 32.0 " |
| sodium hexametaphosphate | 0.1 " |
| hydroxy ethyl cellulose | 0.6 " |
| latex (as example 34) | 100.0 " |

The paint so-prepared was tested by the methods used in example 34, with the following results:

| | |
|---|---|
| opacity | 9 |
| scrub resistance | 450 |
| recoat properties | excellent |
| resistance to polishing (rubbing of dry film) | good |

The volume of vesicles in the dry film was estimated by the above-described density method, making due allowance for the presence of pigment particles in the vesicles (which effect the granule density but not the vesicle volume) and this was found to be about 20%, which is consistent with a fully bound paint film with a vesiculated granule content as prepared.

By way of comparison, a similar paint film was prepared in which the above granules were replaced on an equal volume basis by granules of similar size but with a vesicle volume of 75%. The measured vesicle volume of a dry film of this paint, which had good opacity, was about 35%. The resistance of the film to polishing was, however, markedly inferior to that of the film having the lower measured vesicle volume of 20%.

In a further comparative test, another paint was prepared replacing the vesiculated granules containing 20% by volume of titanium dioxide in the vesicles with granules similar in other respects but in which the titanium dioxide was omitted from the vesicles. A corresponding weight of titanium dioxide was, however, added to the 32.0 parts of that pigment used in preparing the paint. Thus the two paints had equal contents of titanium dioxide and differed primarily in that in one case the pigment was distributed between the matrix and the vesicles of the granules, whereas in the other, all of the pigment was present in the matrix. The opacity of a dry film of the latter paint was estimated to be 7, which illustrates the gain in opacity by utilising some of the pigment as an inclusion in the granule vesicles.

We claim:

1. Vesiculated polymer granules, said vesiculated granules having a plurality of discrete internal vesicles whose walls are provided by said polymer, said granules having a mean diameter of 1–500 micron, the ratio of granule diameter to the mean vesicle diameter being at least 5:1, the maximum diameter of the vesicles being 20 micron and the volume of the vesicles being from 5–95% of the volume of the granules and further characterized in that the vesicles contain particulate solids at a concentration not exceeding 60% of the vesicle volume.

2. Vesiculated polymer granules according to claim 1 in which the maximum diameter of the vesicles is 5 micron.

3. Vesiculated polymer granules according to claim 1 in which the particulate solids concentration of the granules does not exceed 45% of the vesicle volume.

4. Vesiculated polymer granules according to claim 1 in which the particulate solids are pigment particles.

5. Vesiculated polymer granules according to claim 1 in which the polymer of the granules contains pigment in a volume concentration therein up to the critical volume concentration.

6. Vesiculated polymer granules according to claim 1 in which the granules are spheroidal in shape.

7. A paint composition comprising (a) film-forming vehicle, (b) pigment dispersed in the vehicle in a proportion of up to 85% of the volume of (a) plus (b) and (c) vesiculated polymer granules, said vesiculated granules having a plurality of discrete internal vesicles whose walls are provided by said polymer, said granules being dispersed in the vehicle in a proportion of from 5 to 95% of the total solids volume of the paint, characterized in that the vesiculated polymer granules have a mean diameter of 1 to 500 micron, the ratio of the granule diameter to the mean vesicle diameter is at least 5:1, the maximum diameter of the vesicles is 20 micron, the vesicles occupy 5–95% of the total granule volume and the vesicles contain particulate solids at a concentration not exceeding 60% of the vesicle volume.

8. A paint composition according to claim 7 in which the granules are dispersed in the film-forming vehicle in a proportion of from 25 to 60% of the total solids volume of the paint.

9. A paint composition according to claim 7 in which the vesiculated polymer granules are spheroidal and have an essentially non-porous surface.

10. A paint composition according to claim 7 in which the polymer of the vesiculated granules has an elongation at break of 40% maximum.

11. A paint composition according to claim 7 in which the vesicles of the granules have a maximum diameter of 5 micron.

12. A paint composition according to claim 7 in which the vesicles of the granules occupy 20–75% of the total granule volume.

13. A paint composition according to claim 7 in which the vesicles of the polymer granules contain particulate solids at a concentration not exceeding 45% of the vesicle volume.

14. A paint composition according to claim 7 in which the polymer of the vesiculated granules contains pigment at a volume concentration therein not exceeding the critical pigment volume concentration.

15. A paint composition according to claim 7 in which the film-forming vehicle (a) is a solution or dispersion of film-forming polymer in an aqueous liquid and the vesicles of the granules are at least partially filled with an aqueous liquid and said pigment.

16. A matt paint composition comprising (a) film-forming vehicle, (b) pigment dispersed in the vehicle in a proportion of up to 85% of the set volume of (a) plus (b) and (c) vesiculated polymer granules, said vesiculated granules having a plurality of discrete internal vesicles whose walls are provided by said polymer, said granules being dispersed in the vehicle in a proportion of from 5 to 95% of the total solids volume of the paint, characterized in that the vesiculated polymer granules are spheroidal with a mean diameter of 1 to 50 micron and a volume average diameter of from 5 to 35 micron, the ratio of granule diameter to mean vesicle diameter is at least 5:1, the maximum diameter of the vesicles is 20 micron, the vesicles occupy 5–95% of the total granule volume, the polymer of the granules contains from zero to the critical pigment volume concentration of pigment and the vesicles of the granules contain pigment at a concentration of up to 60% of the vesicle volume.

17. A matt paint composition according to claim 16 in which the film-forming vehicle is an aqueous latex of film-forming polymer.

18. A matt paint composition according to claim 16 in which the polymer granules comprise about 20–60% by volume of vesicles.

19. A matt paint composition according to claim 16 in which the volume of granules in the total volume of the paint (calculated on the composition of a dry film thereof) is 25–60%.

20. A matt paint composition according to claim 19 in which the volume of granules is 35–50%.

21. A matt paint composition according to claim 16 which has a high film integrity in which the volume of pigment in the total volume of paint excluding the granules (based on the composition of a dry film thereof) is 5–35%.

22. A matt paint composition according to claim 16 which as a dry film has a gloss (85° gloss head) of 10 maximum, in which the volume of pigment in the total volume of the paint excluding the granules (based on the composition of a dry film thereof) is from the critical pigment volume concentration to about 75% by volume.

23. A matt paint composition according to claim 16 in which the polymer of the vesiculated granules has an elongation at break of 40% maximum.

24. A paint film comprising vesiculated polymer granules according to claim 1.

25. A paint film formed by drying a film of a paint composition according to claim 7.

26. A matt paint film formed by drying a film of a paint composition according to claim 16.

27. Polymer containing dispersed therein vesiculated polymer granules according to claim 1.

28. Paper containing dispersed therein vesiculated polymer granules according to claim 1.

* * * * *

UNITED STATES PATENT OFFICE
CERTIFICATE OF CORRECTION

Patent No. 3,933,579   Dated January 20, 1976

Inventor(s) Robert William Kershaw, Frederick John Lubbock and Livia Polgar

It is certified that error appears in the above-identified patent and that said Letters Patent are hereby corrected as shown below:

IN THE HEADING OF THE PATENT

Under "Foreign Application Priority Data", [30] insert before "June 28, 1971 Australia 5329/71" the following: -- November 28, 1968 Australia 46964/68 --.

Signed and Sealed this

Second Day of November 1976

[SEAL]

Attest:

RUTH C. MASON
Attesting Officer

C. MARSHALL DANN
Commissioner of Patents and Trademarks